United States Patent [19]

Goldman et al.

[11] Patent Number: 5,316,866
[45] Date of Patent: May 31, 1994

[54] STRENGTHENED PROTECTIVE COATINGS FOR SUPERALLOYS

[75] Inventors: Edward H. Goldman, Cincinnati; Ramgopal Darolia, West Chester, both of Ohio

[73] Assignee: General Electric Company, Cincinnati, Ohio

[21] Appl. No.: 756,953

[22] Filed: Sep. 9, 1991

[51] Int. Cl.$^5$ ............... B32B 15/00; C22C 19/05
[52] U.S. Cl. .................... 428/621; 428/632; 428/633; 428/678; 428/680; 420/443; 420/448; 148/410
[58] Field of Search ............... 428/678, 680, 632, 633, 428/621; 420/443, 448; 148/410, 428

[56] References Cited

U.S. PATENT DOCUMENTS

| | | | |
|---|---|---|---|
| 4,152,488 | 5/1979 | Schilke et al. | 428/678 |
| 4,169,742 | 10/1979 | Wukusick et al. | 148/428 |
| 4,198,442 | 4/1980 | Gupta et al. | 427/34 |
| 4,237,193 | 12/1980 | Jackson et al. | 428/678 |
| 4,339,509 | 7/1982 | Dardi et al. | 428/632 |
| 4,446,199 | 5/1984 | Gedwill et al. | 428/639 |
| 4,485,151 | 11/1984 | Stecura | 428/678 |
| 4,758,480 | 7/1988 | Hecht et al. | 428/680 |
| 4,769,087 | 9/1988 | Genereux et al. | 148/410 |
| 4,921,405 | 5/1990 | Wilson | 416/241 |
| 4,961,818 | 10/1990 | Benn | 148/428 |
| 4,995,922 | 2/1991 | Jongenburger | 148/428 |
| 5,035,958 | 7/1991 | Jackson et al. | 428/678 |
| 5,043,138 | 8/1991 | Darolia et al. | 420/443 |
| 5,068,084 | 11/1991 | Cetel et al. | 420/448 |
| 5,077,141 | 12/1991 | Naik et al. | 428/678 |

FOREIGN PATENT DOCUMENTS

| | | |
|---|---|---|
| 0282667 | 9/1988 | European Pat. Off. . |
| 362661 | 4/1990 | European Pat. Off. ............ 148/410 |
| 0386618 | 9/1990 | European Pat. Off. . |
| 0412397 | 2/1991 | European Pat. Off. . |
| 2526683 | 2/1976 | Fed. Rep. of Germany . |
| 3842300 | 6/1990 | Fed. Rep. of Germany . |
| 3842301 | 6/1990 | Fed. Rep. of Germany . |
| 2143065 | 2/1973 | France . |
| 2367833 | 12/1978 | France . |

OTHER PUBLICATIONS

"Metals Handbook", 9th edition, vol. 3, p. 214, TA 472 A3 1980.

Primary Examiner—Michael Lewis
Assistant Examiner—N. M. Nguyen
Attorney, Agent, or Firm—Jerome C. Squillaro; Carmen Santa Maria

[57] ABSTRACT

A superalloy component includes a substrate article of a superalloy, and a strengthenable, adherent coating on the substrate. The coating is preferably a nickel-base superalloy that is strengthened by the formation of gamma and gamma-prime phases. The coating is stronger than conventional MCrAlX coatings, and, therefore, more resistant to thermal fatigue. One operable coating has a composition, in weight percent, of about 7.5 percent cobalt, about 9 percent chromium, about 6 percent aluminum, about 1 percent titanium, about 1.5 percent molybdenum, about 4 percent tantalum, about 3 percent tungsten, about 3 percent rhenium, about 0.5 percent hafnium, about 0.3 percent yttrium, about 0.5 percent columbium, about 0.05 percent carbon, about 0.015 percent boron, about 0.015 percent zirconium, and balance nickel.

9 Claims, 2 Drawing Sheets

STRENGTHENED PROTECTIVE COATINGS FOR SUPERALLOYS

This invention was made with Government support under Contract No. N00019-80-C-0017 awarded by the Naval Air Propulsion Center.

CROSS REFERENCE TO RELATED APPLICATION

This application is related to concurrently filed and commonly assigned application Ser. No. 07/756,947, now abandoned, the disclosure of which is hereby incorporated by reference.

BACKGROUND OF THE INVENTION

This invention relates to the protection of superalloys to be used at elevated temperatures, and, more particularly, to coatings applied to such superalloys.

One of the most demanding materials applications in current technology is found in the hot-stage components used in aircraft jet engines. The higher the operating temperature of an engine, the greater its efficiency, and the more power it can produce from each gallon of fuel. There is therefore an incentive to operate such engines at as high a temperature as possible. The primary limitation on the operating temperatures of a jet engine is the materials used in the hottest regions of the engine, such as gas turbine blades and vanes.

There has been much research to develop materials that can be used in high temperature engine applications. The currently most popular and successful of such materials are the nickel-base superalloys, which are alloys of nickel with additions of a number of other elements such as, for example, chromium, cobalt, aluminum, and tantalum. The compositions of these superalloys are carefully engineered to maintain their strength and other mechanical properties even during use at the high temperature of engine operation, which is in the neighborhood of 2000° F. or more.

The materials used in the jet engines must operate at high temperatures, but additionally are subjected to oxidative and corrosive conditions. Oxidation of materials such as nickel and many of its alloys is rapid at engine operating temperatures. The engine components are also subjected to corrosive attack by chemicals in the burned fuel, as well as ingested agents such as salt that might be drawn into the engine as it operates near an ocean. The materials that have the best mechanical properties at high temperatures often are not as resistant to oxidation and corrosion as other materials, and there is an ongoing search for materials that offer a compromise between the best mechanical properties and the best oxidation and corrosion resistance.

High operating temperatures can also be achieved by other techniques not related directly to the alloy compositions used in the components. For example, control of grain structures and preparation of components as single crystals may result in improved properties. Cooling passages may be provided in the components, and cooling air passed through them to lower their actual operating temperature.

In another approach which is the primary focus of the present invention, a thin protective metallic coating is deposited upon the component. The coating protects the substrate from oxidation and corrosion damage The coating must be adherent to the superalloy substrate and must remain adherent through many cycles of heating to the operating temperature and then cooling back to a lower temperature when the engine is idling or turned off. Because materials of different compositions have different coefficients of thermal expansion, cycles of heating and cooling tend to cause the coating to crack and/or spall off, which results in the exposure of the superalloy substrate to the environment, and subsequent deterioration of the substrate.

To accommodate the strains imposed by the thermal cycling, the thin coatings have historically been made of materials that are relatively weak and ductile at operating temperatures. In theory, such a coating can plastically deform either in tension or compression to remain adherent to the surface of the substrate as the substrate is heated and cooled. Most coatings for nickel-base superalloys have been made of alloys of nickel, chromium, aluminum, and yttrium, which are termed NiCrAlY alloys, and nickel, cobalt, chromium, aluminum, and yttrium, which are termed NiCoCrAlY alloys. The term MCrAlX, where M represents nickel, cobalt, iron or some combination thereof and X represents yttrium, hafnium, tantalum, silicon or some combination thereof, is a widely used generic description for this type of alloy. While such alloys contain many of the same elements as the substrate materials, the proportions of those elements have been adjusted to enhance oxidation and corrosion resistance rather than mechanical properties. They therefore lack the strength to serve as the structural components themselves, but serve well as protective coatings.

However, recent engine operating experience has shown that such coatings may be too weak for some applications characterized by large amounts of cyclic plastic strain. Under such conditions a weak coating is vulnerable to wrinkling and cracking. The resulting cracks may extend through the coating to the substrate, and in those locations the substrate is subject to the same deterioration as if it had not been coated with the protective coating. Thus, even though the coatings do not necessarily need the strength to function as the primary load bearing structural members, they must be sufficiently strong to resist cracking or failure induced by thermal fatigue as the coated substrate is repeatedly heated and cooled. For this reason, as superalloy substrates of increased strength and operating temperatures are developed, it is necessary that the strength of coatings used on these substrates also be improved. At the present time, improved strengths of the coating materials are needed so that the coatings will not fail prematurely, long before the substrates would fail.

Therefore, there is an ongoing need for improved metallic coating materials that can protect the substrates against oxidation and corrosion damage for extended periods of cyclic loading. The present invention fulfills this need, and further provides related advantages.

SUMMARY OF THE INVENTION

The present invention provides a class, and specific alloy compositions, of metallic coating materials useful in protecting high-temperature superalloys. The compositions are compositionally and structurally compatible with the superalloy substrates, protect against oxidation and corrosion damage, and remain adherent, crack free, and protective for greater periods of time than prior metallic superalloy coatings. The coatings can be formulated and applied by conventional techniques.

In accordance with the invention, a coated superalloy component comprises a substrate article formed of a superalloy; and an adherent coating over at least a portion of the substrate, the coating being strengthenable by heat treatment.

In one preferred embodiment, the composition of the coating, in weight percent, consists essentially of from about 5 to about 10 percent cobalt, from about 8 to about 12 percent chromium, from about 5 to about 7 percent aluminum, from 0 to about 2 percent titanium, from about 1 to about 3 percent molybdenum, from about 2 to about 6 percent tantalum, from about 2 to about 4 percent tungsten, from 0 to about 4 percent rhenium, from 0 to about 1 percent hafnium, from 0 to about 1 percent yttrium, from 0 to about 1 percent columbium, from 0 to about 0.07 percent carbon, from 0 to about 0.030 percent boron, from 0 to about 0.030 percent zirconium, and balance nickel. (All compositions herein are expressed in weight percent, unless indicated to the contrary.)

The coatings of the invention represent a significant departure from conventional thinking in the metallic coating area. Heretofore, metallic superalloy coatings were made weak and ductile, to accommodate the strains imposed by the substrate as the component was repeatedly heated and cooled. The coating is deformed in complex planar strain conditions that are dictated by the deformation of the more massive substrate. The coating must deform plastically and/or in creep to a new set point during the temperature and load cycling of the engine, and a weak coating was deemed most desirable to operate under these constraints.

It was observed in the research underlying the present invention that metallic coatings tend to fail in thermal fatigue, and that the soft coatings did not offer sufficient mechanical resistance to such fatigue failure. The present invention therefore provides a coating that is stronger and more fatigue resistant than the MCrAlX alloys conventionally used as metallic coating materials, while maintaining acceptable oxidation and corrosion resistance.

The present invention provides an important advance in the art of superalloys, as well as a departure from the conventional thought in the field. The coating class of the invention permits mechanical damage resistance to be altered through strengthening of the coating, while retaining the chemical components that lead to oxidation and corrosion resistance. Other features and advantages of the invention will be apparent from the following more detailed description of the preferred embodiment, taken in conjunction with the accompanying drawings which illustrate, by way of example, the principles of the invention.

DETAILED DESCRIPTION OF THE PREFERRED EMBODIMENT

Figure 1:
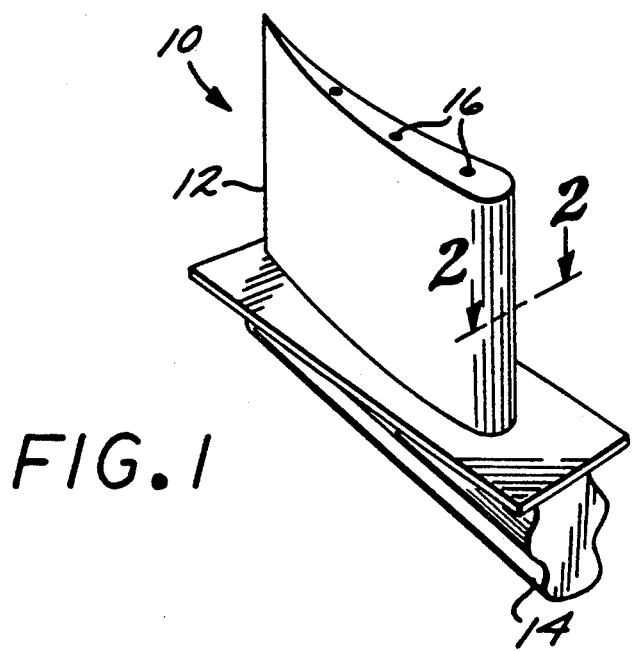
FIG. 1 is a perspective view of a turbine blade having a metallic protective coating.

The coating of the invention is preferably applied as an overlay coating in any of a variety of applications to nickel-base superalloy substrates. One such application is a coating on a jet engine gas turbine blade 10 as illustrated in FIG. 1. The substrate of the blade 10 may be formed of any suitable superalloy. One example of such a superalloy is Rene' 80, a well known nickel-base superalloy which has a nominal composition, in weight percent, of 14 percent chromium, 9.5 percent cobalt, 5 percent titanium, 4 percent tungsten, 4 percent molybdenum, 3 percent aluminum, 0.17 percent carbon, 0.06 percent zirconium, 0.015 percent boron, and the balance nickel. Another example is a more advanced nickel-base superalloy such as Rene' N4, having a composition, in weight percent, of 7.5 cobalt, 9.0 chromium, 3.7 aluminum, 4.2 titanium, 1.5 percent molybdenum, 4.0 percent tantalum, 6.0 percent tungsten, 0.5 percent columbium, and balance nickel. These substrate superalloys are presented as examples, and the coatings are not limited for use with these substrates.

Such a blade 10 includes an airfoil section 12 against which hot combustion gases are directed when the engine operates, and whose surface is subjected to severe oxidation and corrosion attack during service. If the surface of the airfoil section 12 is not protected against oxidation and corrosion in some fashion, it will last at most only a few cycles of operation. The airfoil section 12 is anchored to a turbine disk (not shown) through a root section 14. In some cases, cooling passages 16 are present in the airfoil section 12, through which cool bleed air is forced to remove heat from the blade 10. The blade 10 is normally prepared by a casting and solidification procedure well known to those skilled in the art, such as investment casting or, more preferably, directional solidification or single crystal growth.

Figure 2:
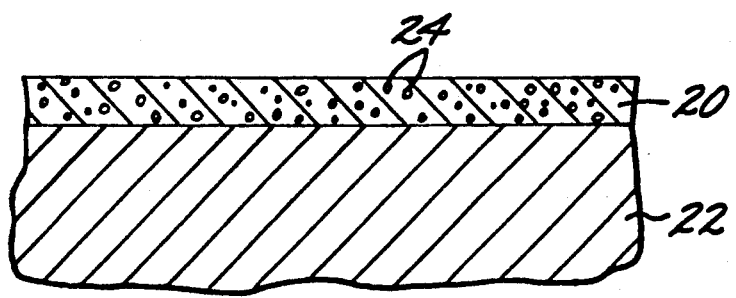
FIG. 2 is an enlarged sectional view of the turbine blade of FIG. 1, taken along lines 213 2.

According to the present invention, the airfoil section 12 is protected by a metallic protective coating 20, as illustrated in detail in FIG. 2, which depicts an enlargement of a section through the surface portion of the blade 10. The nickel-base superalloy of the blade 10 forms a substrate 22 upon which and over which the coating 20 is deposited. In this application, the coating 20 is directly exposed to the oxidative and corrosive environment.

Figure 3:
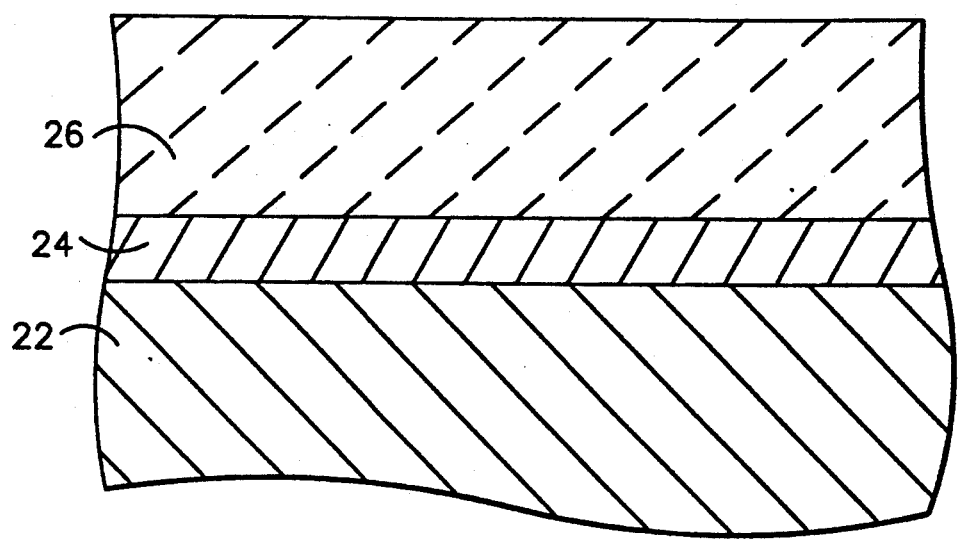
FIG. 3 is a sectional view similar to that of FIG. 2, with a thermal barrier coating overlying the metallic coating.

Another application is a thermal barrier coating system illustrated in FIG. 3. The coating of the present invention is applied as a base coating 24 overlying the substrate 22. A ceramic thermal barrier coating 26 is applied overlying the base coating 24. Thermal barrier coating systems have been known previously, but the coatings of the present invention have not been known for use as the base coatings 24.

Figure 4:
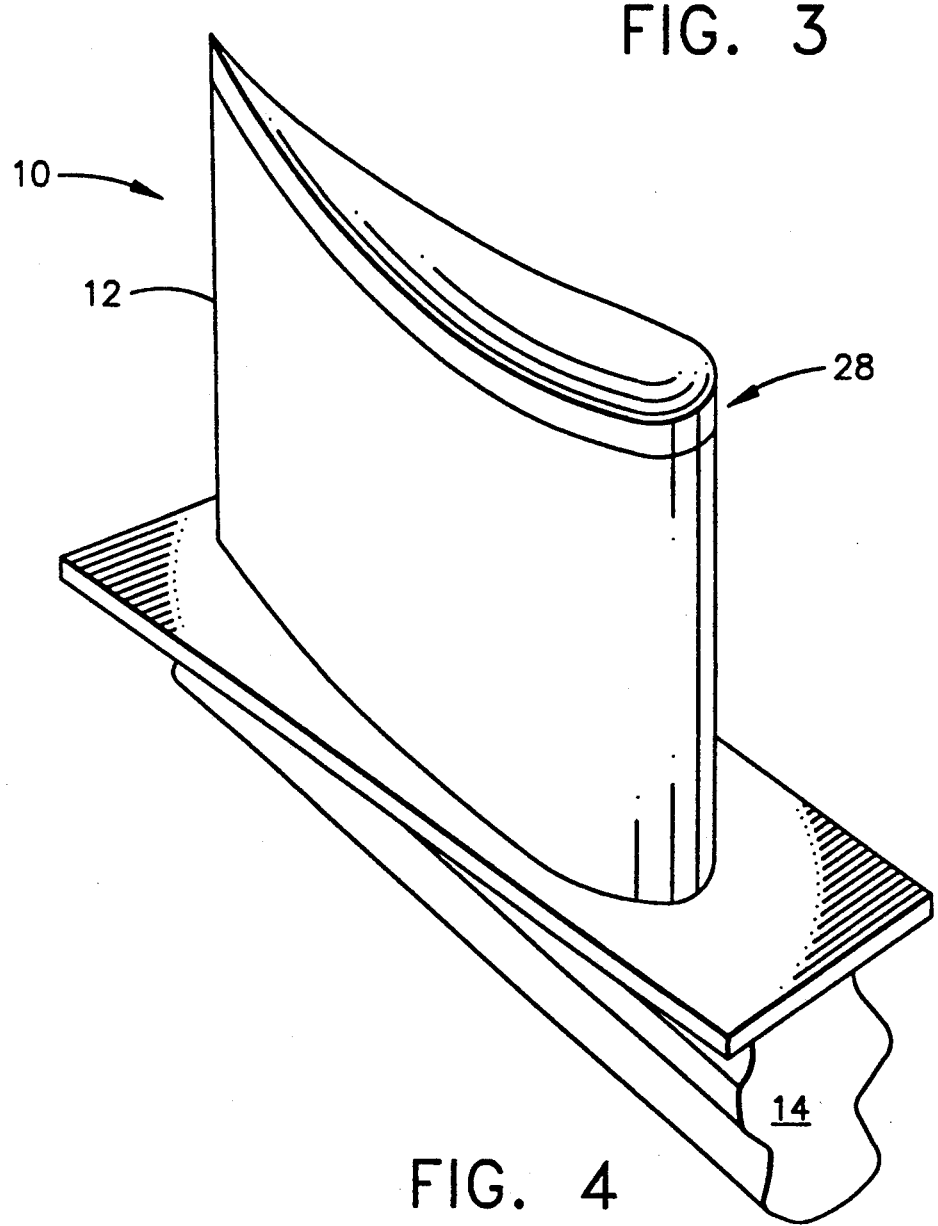
FIG. 4 is a perspective view of a turbine blade with a tip formed of a coating material.

In another application, the coating material of the invention is utilized as a blade tip coating 28 on the airfoil section 12, as illustrated in FIG. 4. Although such a coating 28 may be thicker than coatings 20 and 24 of FIGS. 2 and 3, as used herein such a blade tip material is deemed to be within the definition of "coating".

In each of these applications, the alloy of the invention is overlaid onto a substrate. In the coating and thermal barrier coating applications of FIGS. 2 and 3, the overlay is relatively thin and would conventionally be termed a "coating". A blade tip application such as shown in FIG. 4 is defined herein as a "coating", regardless of its thickness.

In accordance with one preferred embodiment of the invention, the coating composition is made generally similar to that of the substrate, except for the addition of elements that improve the oxidation and corrosion resistance, at a cost of reduced mechanical properties. The selection of a composition for the coating 20 that is similar to that of the substrate 22 minimizes the thermal expansion difference between the coating 20 and the substrate 22, and also minimizes interdiffusion of elements between the coating 20 and the substrate 22 during elevated temperature exposure. Maintenance of a low thermal expansion difference minimizes the extent of thermal cycling damage, which is the primary cause of degradation of the coating. A similar composition also reduces the tendency of the coating to change composition during service by interdiffusion of elements with the substrate. Such diffusion-driven compositional changes are one of the reasons that coatings degrade during service, as their compositions and thence properties change. The coating 20 also has a composition that is strengthened by the same heat treatment used to strengthen the substrate 22.

In one approach, termed Alloy A herein, the coating 20 applied to a Rene' N4 substrate has a composition, in weight percent, of about 7.5 percent cobalt, about 9 percent chromium, about 6 percent aluminum, about 1 percent titanium, about 1.5 percent molybdenum, about 4 percent tantalum, about 3 percent tungsten, about 3 percent rhenium, about 0.5 percent hafnium, about 0.3 percent yttrium, about 0.5 percent columbium, about 0.05 percent carbon, about 0.015 percent boron, about 0.015 percent zirconium, and balance nickel.

This coating is preferably applied by vacuum plasma spraying, a procedure well known to those in the art. In vacuum plasma spraying, powders whose total composition is that of the coating are melted in a plasma and propelled against the substrate, where they solidify to form the coating. The operation is carried out in a vacuum or inert gas at a pressure below about 0.1 atmosphere. The thickness of the coating is typically from about 0.002 to about 0.050 inch, most preferably about 0.004 inch, for coating applications such as shown in FIGS. 2 and 3, and about 0.030 inch for blade tip coating applications such as shown in FIG. 4.

The composition of this preferred coating material is substantially identical to that of the Rene' N4 substrate as to cobalt, chromium, molybdenum, tantalum, columbium, and nickel, which together account for about 86.1 percent of the coating alloy.

The aluminum content of the coating is increased substantially with respect to the amount present in the substrate material for two reasons. First, aluminum is an important contributor to the oxidation and corrosion resistance of the coating, through the formation of aluminum oxide at the exposed surface of the coating. Second, aluminum promotes the formation of the gamma-prime strengthening phase, which is often represented as $Ni_3(Al,Ti)$.

On the other hand, the titanium content is reduced by about as much as the aluminum content is increased. Titanium has a tendency to lower the melting point of the alloy, and also is somewhat detrimental to oxidation resistance.

The tungsten content of the substrate material is replaced in part with rhenium. Rhenium is a more potent solid solution strengthener of the gamma phase than tungsten.

Hafnium, carbon, and boron are added as grain boundary strengtheners. These elements tend to prevent grain boundary creep that can lead to thermal fatigue and creep failure. Hafnium is also beneficial in promoting environmental resistance of the coating material.

Yttrium is added to the coating to improve the environmental resistance of the alloy. The yttrium content can alternatively be increased to a level where a fine dispersion of yttrium oxide particles can be developed in the vacuum plasma sprayed coating The particles further aid in strengthening the coating. This phenomenon is an important aspect of the invention disclosed in related application Ser. No. 07/756,947 now abandoned.

The cobalt content of this embodiment of the coating material can vary from about 5 to about 10 percent. The cobalt contributes to the alloy properties in at least two ways. First, it raises the solvus temperature of the gamma prime phase, permitting higher operating temperatures. Second, it improves stability of the gamma phase by inhibiting sigma phase precipitation.

The chromium content of the Rene' N4 and the coating can vary from about 8 to about 12 percent. If the chromium content is significantly lower, the oxidation and corrosion resistance of the coating is reduced. If the chromium content is higher, there is an increased tendency to form the embrittling sigma phase.

The molybdenum content of the Rene' N4 and the coating is from about 1 to about 3 percent. The molybdenum aids in solid solution strengthening of the gamma and gamma prime phases. If the molybdenum content is reduced below about 1 percent, there is a loss of strength of these phases. If the molybdenum content is more than about 3 percent, there is reduced corrosion resistance in some circumstances.

The tantalum content of the Rene' N4 and the coating is from about 2 to about 6 percent. Tantalum partitions to, and reacts to form, the gamma prime phase. If its content is reduced below about 2 percent, there may be difficulty in forming a sufficient fraction of the gamma prime phase, and the hot corrosion resistance of the coating may be diminished. If the tantalum content is raised above about 6 percent, there is an increased tendency to form sigma phase during extended exposure and the density of the alloy is increased.

The columbium content of the Rene' N4 and the coating is from 0 to about 1 percent. Columbium partitions primarily to the gamma prime phase. At least about 0.1 percent is beneficial in generally promoting good mechanical properties. Too much columbium, above about 1 percent, depresses the melting point of the coating by an unacceptable amount.

The aluminum content of the coating is from about 5 to about 7 percent. Aluminum is the primary gamma prime forming element, and also contributes to oxidation resistance. If the aluminum content is below about 5 percent, there is insufficient volume fraction of gamma prime phase to achieve good creep rupture strength, and the oxidation resistance of the alloy is low. If the aluminum content is above about 7 percent, there is an increased tendency to form the brittle sigma phase during extended exposure at elevated temperature.

The titanium content of the coating is from about 0.1 to about 2 percent. A small amount of titanium should be present to aid in formation of gamma prime phase. If the titanium content is more than about 2 percent, the melting point is depressed and oxidation resistance is decreased.

The tungsten content of the coating is from about 2 to about 4 percent, and the rhenium content of from about 0 to about 4 percent. These two elements substitute for each other. If the tungsten is present in an amount of less than about 2 percent, the solid solution strengthening of the gamma phase is reduced. A rhenium content above about 4 percent can lead to an increased tendency to form the brittle sigma phase. If the tungsten content is larger than about 4 percent there is increased density of the coating, and the resistance of the coating to oxidation and hot corrosion is reduced.

The hafnium content of the coating is from 0 to about 1 percent, the carbon content is from 0 to about 0.07 percent, the zirconium content is from 0 to about 0.030 percent, and the boron content is from 0 to about 0.030 percent. These elements strengthen the grain boundaries. Amounts above the maximum can lead to grain boundary embrittlement, also a cause of premature failure.

Yttrium is present in the coating in an amount of from 0 to about 1 percent. Yttrium in a small amount improves oxidation resistance. If the amount of yttrium is above about 0.5 percent, some yttrium may oxidize during vacuum plasma spraying to form small yttrium oxide particles in the coating that improve the strength by dispersion strengthening.

The changes in alloying content result in an increase in ultimate tensile strength for the coating alloy of the invention as compared with conventional MCrAlX alloys, of from 8,800 to 53,000 pounds per square inch (psi) at 1800° F. and from 3,900 to 12,000 psi at 2000° F. The strength of the coating Alloy A of this embodiment is therefore on the same order as the strength of the underlying superalloy.

The preferred composition of the alloy of this embodiment was tested in a burner rig thermal fatigue test against specimens coated with a CODEP coating using a conventional pack-diffusion process such as disclosed in U.S. Pat. No. 3,540,878. In this test, Rene' N4 specimens coated with the various coatings were cycled between 970° F. and 1800° F. for 5000 cycles and inspected. The specimens coated with the alloy of the invention exhibited more cracks than those coated with the CODEP coating, but the cracks were shorter and therefore less severe and potentially damaging than those in the CODEP-coated specimens. Other specimens coated with the coating of this embodiment and with a CODEP coating were tested in an accelerated burner rig oxidation test at 2075° F. and Mach 1 gas velocity. The coating of the invention produced a lifetime to failure of 245 hours as against a lifetime of 125 hours for the CODEP-coated specimens. In a comparative hot corrosion test at 1700° F. and 5 ppm (parts per million) salt environment, the coating of the invention had a lifetime of 600 hours while the CODEP-coated specimen had a lifetime of 550 hours. In summary, the comparative testing demonstrated that the alloy of this embodiment had substantially greater strength properties than conventional coatings, and resistance to thermal fatigue, oxidation, and corrosion at least that of conventional coatings.

In another embodiment of the invention, an existing metallic coating material is modified to permit it to be strengthened, while still retaining its oxidation and corrosion resistant properties. For example, one widely used NiCoCrAlY coating alloy has a composition, in weight percent, of about 20 percent cobalt, 18 percent chromium, 12 percent aluminum, 0.3 percent yttrium, and balance nickel. A satisfactory coating alloy, termed Alloy B herein, is obtained by leaving the major alloying elements substantially as they are, and adding about 6 percent tantalum, 2 percent rhenium, 1 percent silicon, 0.05 percent carbon, 0.015 percent boron, and 0.015 percent zirconium.

Alloy B possesses the good oxidation and corrosion resistance of NiCoCrAlY, but has additional strength due to the increased tantalum content that contributes to increased gamma prime formation. Additionally, the rhenium acts as a solid solution strengthening element to increase the strength of the gamma phase. Silicon increases oxidation and corrosion resistance.

Alloy B is not as strong as Alloy A of the previously discussed embodiment, but has improved cracking resistance and resistance to oxidation and corrosion damage. This coating Alloy B was coated onto Rene' N4 specimens in the manner discussed previously, and subjected to testing as described previously. After 5000 cycles of the burner rig thermal fatigue test, the specimens with this Alloy B coating exhibited both fewer and less severe cracks than either the Alloy B coating or the CODEP coating. The life of the specimen with the Alloy B coating was 490 hours in the oxidation test, and over 1600 hours in the hot corrosion test.

Compared to the NiCoCrAlY alloy described above, Alloy B is significantly stronger. At 1800° F., the tensile strength of Alloy B was 17,000 psi, while that of the NiCoCrAlY alloy was 6,000 psi. At 1600° F. and a stress of 3,000 psi, the rupture life of Alloy B was 640 hours, while that of the NiCoCrAlY alloy was 13 hours.

Alloys such as Alloy A and Alloy B have appreciable strength in the as-coated condition, but significantly greater strength can be developed by heat treatment. For example, specimens of Alloy A were heat treated 2 hours at 2200° F. The tensile strength was 12,000 psi at 2000° F., and 53,000 psi at 1800° F. The creep life for 1% creep at 1800° F. and 2,000 psi was 46 hours. However, even higher strength levels could be achieved through a two-step heat treatment, namely, 2 hours at 2200° F. plus 2 hours at 2310° F. After the two-step heat treatment, the tensile strength was 24,000 psi at 2000° F. and more than 74,000 psi at 1800° F. A creep test at 1800° F. and 2,000 psi was discontinued after 644 hours without achieving 1% creep. Specimens of an alloy generally similar to Alloy B were given the same two-step heat treatment. The tensile strength was 10,000 psi at 1800° F. The rupture life at 1600° F. and 3,000 psi was 506 hours. These experiments demonstrated that the strength of alloys of the present invention can be increased by heat treatment. However, those skilled in the art will recognize that the selection of heat treatment for a coating is necessarily dependent on the selection of substrate material; because the substrate is a principal structural member, it is appropriate to select a heat treatment to optimize the properties of the substrate, even though that heat treatment might not optimize the properties of the coating.

In yet a third preferred embodiment of the invention, the coating alloy has a broad composition, in weight percent, of from about 12 to about 22 percent chromium, from about 5.8 to about 7.2 percent aluminum, from about 4 to about 20 percent cobalt, from about 3 to about 7 percent tantalum, from about 0 to about 4 percent rhenium, from about 0 to about 2.0 percent hafnium, from about 0 to about 1.0 percent yttrium, from about 0 to about 1.5 percent silicon, from about 0 to about 0.05 percent zirconium, from about 0 to about 0.1 percent carbon, from about 0 to about 0.05 percent boron, balance nickel. More preferably, the coating alloy has a composition of from about 17 to about 19 percent chromium, from about 6.25 to about 6.75 percent aluminum, from about 9 to about 11 percent cobalt, from about 5.75 to about 6.25 percent tantalum, from about 1.8 to about 2.2 percent rhenium, from about 0.4 to about 0.6 percent hafnium, from about 0.2 to about 0.4 percent yttrium, from about 0.8 to about 1.2 percent silicon, from about 0.010 to about 0.020 percent zirconium, from about 0.04 to about 0.08 percent carbon, from about 0.01 to about 0.02 percent boron, balance nickel.

In a most preferred embodiment, termed Alloy C herein, this third composition of alloy has about 10 percent cobalt, about 18 percent chromium, about 6.5 percent aluminum, about 6 percent tantalum, about 2 percent rhenium, about 0.5 percent hafnium, about 0.05 percent carbon, about 0.015 percent boron, about 0.015 percent zirconium, about 0.3 percent yttrium, and about 1.0 percent silicon.

This Alloy C was tested for mechanical and physical properties. It exhibits an ultimate tensile strength at 1800° F. of about 25,000 psi and at 2000° F. of about 5,000 psi. These strengths are superior to those of conventional NiCoCrAlY alloys, but not as high as those of the preferred embodiment of the first alloy composition discussed previously. A coating of an alloy similar to Alloy C was deposited on Rene' N4 specimen substrates and tested, using the approach discussed previously. Results of burner rig thermal fatigue tests indicated that this alloy is superior to CODEP, as measured by both in amount and severity of cracking. In an oxidation test at 2150° F., specimens coated with Alloy C survived over 200 hours, which is almost twice the life of a CODEP-coated specimen tested at 2075° F. A specimen coated with Alloy C survived over 1600 hours in a hot corrosion test before the test was discontinued. By comparison, CODEP-coated material survived only about 550 hours in the same type of test.

The particular alloying elements in the coating composition of the invention, and their quantitative amounts and limits, were selected with attention to their properties in combination. That is, the presence and amount of each element was selected with consideration of the effect on the other alloying elements in the coating. Consequently, selection of alloying elements, and their amounts and limits, cannot be arbitrarily selected, but are instead constrained by the principles set forth previously.

Thus, the present approach provides an advancement in the protection of superalloy substrates, and more particularly nickel-base superalloy substrates by metallic protective coatings. Although the present invention has been described in connection with specific examples and embodiments, it will be understood by those skilled in the arts involved, that the present invention is capable of modification without departing from its spirit and scope as represented by the appended claims.

What is claimed is:

1. A coated superalloy component, comprising:
a substrate article formed of a superalloy; and
an adherent coating over at least a portion of the substrate, the coating being strengthenable by heat treatment, wherein the composition of the coating, in weight percent, consists essentially of about 20 weight percent cobalt, about 18 weight percent chromium, about 12 weight percent aluminum, about 6 weight percent tantalum, about 2 weight percent rhenium, about 0.05 weight percent carbon, about 0.015 weight percent boron, about 0.015 weight percent zirconium, about 0.3 weight percent yttrium, about .1 weight percent silicon, and balance nickel.

2. A coated superalloy component comprising:
a substrate article formed of a superalloy; and
an adherent coating over at least a portion of the substrate, the coating being strengthenable by heat treatment, wherein the composition of the coating, in weight percent, consists essentially of, from about 17 to about 19 percent chromium, from about 6.25 to about 6.75 percent aluminum, from about 9 to about 11 percent cobalt, from about 5.75 to about 6.25 percent tantalum, from about 1.8 to about 2.2 percent rhenium, from about 0.4 to about 0.6 percent hafnium, from about 0.2 to about 0.4 percent yttrium, from about 0.8 to about 1.2 percent silicon, from about 0.010 to about 0.020 percent zirconium, from about 0.04 to about 0.08 percent carbon, from about 0.01 to about 0.02 percent boron, balance nickel, wherein said composition provides resistance to oxidation and corrosion superior to that of the substrate article.

3. The component of claim 2, wherein the article is a turbine blade.

4. The component of claim 2, wherein the article is a turbine vane.

5. The component of claim 2, wherein the superalloy is a nickel-base superalloy.

6. The component of claim 2, wherein the composition of the coating, in weight percent, consists essentially of, about 10 percent cobalt, about 18 percent chromium, about 6.5 percent aluminum, about 6 percent tantalum, about 2 percent rhenium, about 0.5 percent hafnium, about 0.05 percent carbon, about 0.015 percent boron, about 0.015 percent zirconium, about 0.3 percent yttrium, and about 1.0 percent silicon.

7. The component of claim 2, wherein the article is a turbine blade, and the coating covers only a tip portion of the turbine blade.

8. The component of claim 2, wherein a ceramic thermal barrier coating covers at least a portion of the adherent coating.

9. A composition of matter which, in weight percent, consists essentially of about 20 weight percent cobalt, about 18 weight percent chromium, about 12 weight percent aluminum, about 6 weight percent tantalum, about 2 weight percent rhenium, about 0.05 weight percent carbon, about 0.015 weight percent boron, about 0.015 weight percent zirconium, about 0.3 weight percent yttrium, about 1 weight percent silicon, and balance nickel.

* * * * *